United States Patent
Watts

[15] 3,702,513
[45] Nov. 14, 1972

[54] BITE DETECTORS FOR USE WITH FISHING LINES

[72] Inventor: Peter J. Watts, Baldhu House, 38 Polkyth Road, St. Austell, Cornwall, England

[22] Filed: Sept. 17, 1970

[21] Appl. No.: 73,143

[52] U.S. Cl. .................................. 43/17, 43/43.12
[51] Int. Cl. ............................................. A01k 97/12
[58] Field of Search ...................................... 43/17

[56] References Cited

UNITED STATES PATENTS

| | | | |
|---|---|---|---|
| 2,741,055 | 4/1956 | Weber, Jr. | 43/17 |
| 2,986,835 | 6/1961 | Ordinetz et al. | 43/17 |
| 3,250,036 | 5/1966 | Wenger | 43/17 |
| 2,580,956 | 1/1952 | Reddick | 43/17 |

Primary Examiner—Samuel Koren
Assistant Examiner—Daniel J. Leach
Attorney—Edwin E. Greigg

[57] ABSTRACT

A bite detector device comprising a casing having a slot in an exposed face attached to a fishing rod and housing a pair of nipper elements which are spring-urged towards each other within the slot and arranged to releasably grip part of a fishing line disposed in the slot. The nipper elements are held apart as long as the line is held therebetween. When the line, under a predetermined tension, is jerked free of the nipper elements, the latter come together to initiate an alarm. Preferably the nipper elements are conductive and complete an indicator circuit when they contact each other.

8 Claims, 5 Drawing Figures

PATENTED NOV 14 1972 3,702,513
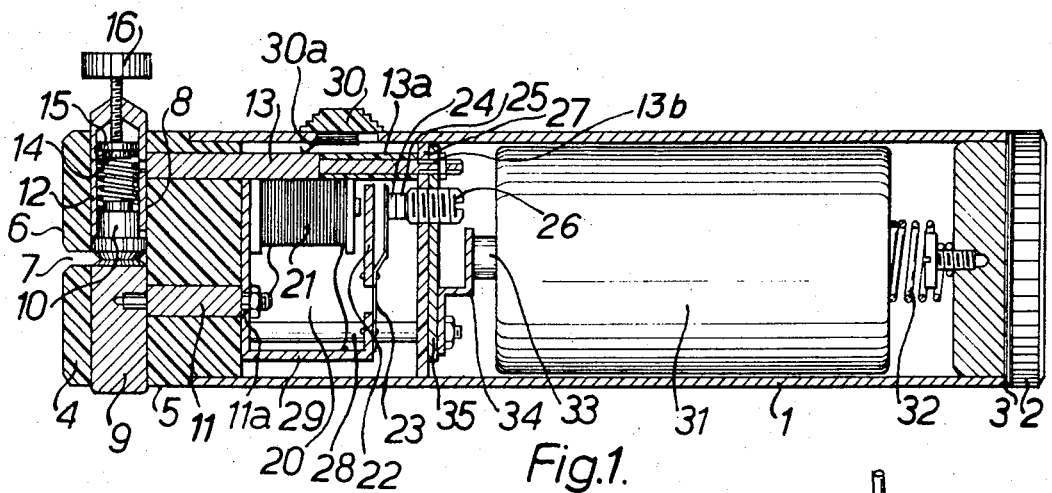
Fig.1.
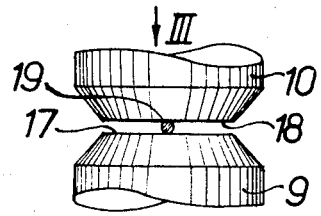
Fig.2.
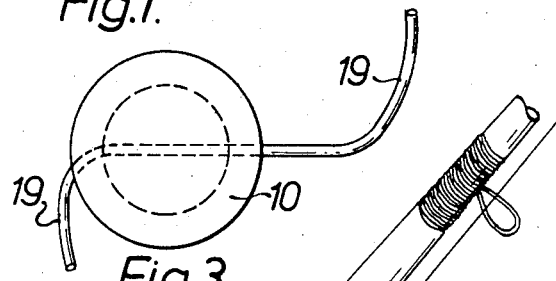
Fig.3.
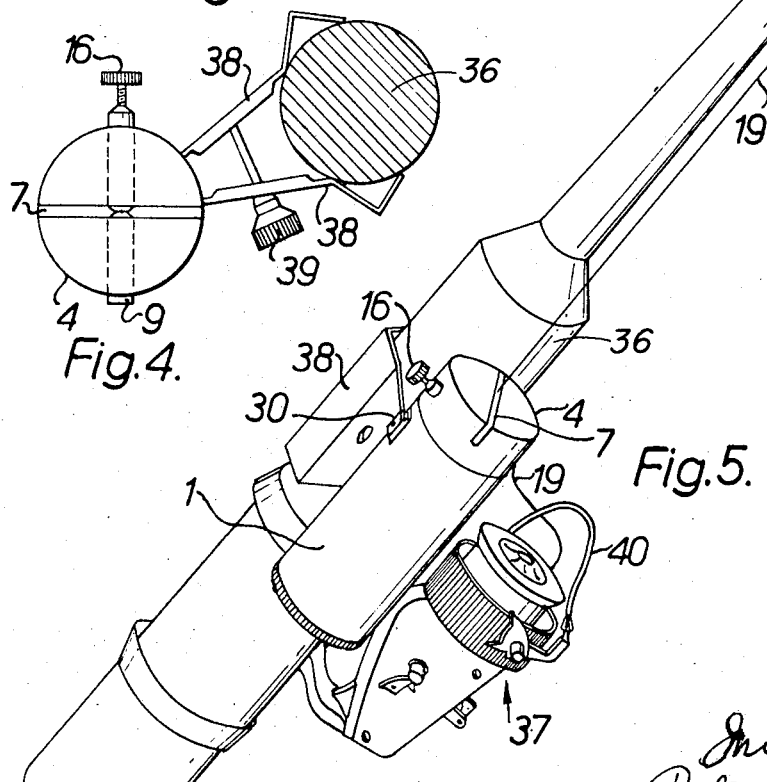
Fig.4.
Fig.5.
Inventor
Peter J. Watts
by
Edwin E. Greigg

BITE DETECTORS FOR USE WITH FISHING LINES

This invention relates to a bite detector device for use with a fishing line.

An object of the invention is to provide a device capable of giving warning automatically when a load in excess of a predetermined magnitude is applied to a fishing line, indicating that a fish has taken the line.

According to the invention there is provided a bite detector device for use with a fishing line, comprising a pair of relatively movable nipper elements which are spring-urged towards each other, the device being so arranged that part of a fishing line may be located between the nipper elements and releasably gripped thereby, and electrically operated indicator or warning means connected in an electrical energizing circuit which is arranged to be closed in response to relative movement of the nipper element into contact with each other upon removal of a fishing line from between said elements.

Preferably the nipper elements, or parts thereof, are themselves electrically conductive and form part of said electrical circuit, thereby avoiding the need to provide separate electrical contacts, said nipper elements making electrical contact with each other to complete said circuit upon removal of said portion of line from between the elements.

The device is preferably portable and housed in a casing. To this end the indicator or warning means may be energized from a convenient portable power source, for example a dry cell or cells, housed within the casing in use of the device. The device may be provided with an external clamp or like fitting attachment for releasably attaching the device to a fishing rod.

The circuit of the device may be enclosed within the casing in a completely fluid-tight manner, the nipper elements being mounted in a head, for example a moulded plastics block, at one end of the casing. Said head is preferably provided with a transverse slot into which a part of a fishing line, for example, that between a reel and the water, may be introduced, the two nipper elements being arranged to meet under the influence of their spring bias within said slot, so that said part of the fishing line may be interposed between said nipper elements.

The device according to the invention is particularly suitable for use in conjunction with fishing rods having reels of the so-called fixed spool type which are adapted to be mounted on the fishing rod with the reel axis parallel to the axis of the fishing rod, said reel being stationary and cooperating with a rotary bail arm or guide which feeds line into the reel when winding in. When it is desired to effect a free cast of the line the bail arm or guide is swung out of cooperation with the line so that line may pass unhindered from one end of the reel. Such fixed spool reels are commonly used in so-called "coarse" fishing.

When the device according to the invention is in use it is clamped to the fishing rod at a convenient position adjacent the position occupied by the reel. A part of the line issuing from the reel is located and releasably clamped between the two nipper elements, holding the latter apart. From the nipper elements the line passes along the rod in the conventional way into the water.

When the line is in the water it is usually not anchored at the reel, so that in the event of a fish taking the line the latter can be paid out unhindered from the reel.

The technique normally adopted in "coarse" fishing is to allow the fish to "have its head" initially and to swim away with the line while the latter pays out from the reel for a certain time, usually of the order of about 5 seconds. After this time, the angler "strikes" by locking the line relative to the reel, by means, well know per se, provided for this purpose on the reel, and the running-out of the line is halted abruptly to cause the fish to be hooked. The difficulty experienced hitherto has been in detecting when a fish has "taken" the end of the line so as to stop the paying out of the line at the required time, since the angler does not always have an indication that a fish has taken the end of the line, particularly if the line or the rod is left unattended by the angler in a suitable support.

By using a bite detector device according to the invention a warning or indication is given immediately when the line is withdrawn from its initial position between the nipper elements; having been given this warning, the angler then has ample time in which to take up his line and lock the reel.

Different types of fish are known to exert different initial pulls on a line when first taking the end of the line. Preferably, therefore, the force needed to pull the line from its normal position between the nipper elements can be adjusted over a wide range by suitable means on the device which adjust the pressure with which the nipper elements engage each other. By this means the device may be adapted for use under different fishing conditions, for example, when fishing for different types of fish or in currents of different strengths.

The indicator or warning means preferably take the form of an electrically operated audible warning device, for example a buzzer. Alternatively, or in addition, a visible warning, such as a steady or flashing light, may be provided by said indicator or warning means.

A device according to one embodiment of the invention will now be described, way of example, with reference to the accompanying drawings, in which:

FIG. 1 is an axial section through a bite detector device according to said embodiment of the invention;

FIG. 2 is a diagrammatic end view on an enlarged scale of the contacting regions of the two nipper elements employed in the device of FIG. 1, showing part of a line located therebetween;

FIG. 3 is a diagrammatic side view in the direction of arrow III in FIG. 2;

FIG. 4 is a diagrammatic end view of the bite detector device of FIG. 1 clamped to a fishing rod, and viewed from the free end of the rod, and FIG. 5 is a perspective view of part of a fishing rod fitted with the bite detector device according to said embodiment of the invention.

Referring first to FIG. 1, the bite detector device has a tubular metal casing 1, preferably of stainless steel, sealingly closed at one end by a removable cap 2 of metal, also preferably stainless steel. A resilient annular washer 3 is interposed between the cap 2 and the casing 1 to effect a water-tight seal therebetween.

A head 4 comprising a cylindrical molded body of plastic material, for example Nylon, is force-fitted within the other end of the casing 1 to form a sealed closure at this end also. The plastic body has a cylindrical end portion 5 which projects beyond the said end of casing 1 and has the same external diameter as the latter, so that it is substantially flush therewith.

The head 4 is formed with a flat outer face 6 which is divided centrally by a transverse slot 7 the width of which is such that it can freely receive a part of a fishing line of the gauge with which the device is intended to be used.

The portion of the head 4 projecting beyond the casing 1 is provided with a cylindrical transverse bore 8 the axis of which is perpendicular to and intersects the slot 7 and the axis of the casing 1.

Respective cylindrical nipper elements 9, 10, preferably of stainless steel, are located within the respective halves of the bore 8 disposed on opposite side of the slot 7, the nipper element 9 being fixed in the bore 8 by means of a metal locating and connector pin 11 extending through the head 4 into the interior of the casing 1. The other nipper element 10 is mounted for sliding movement along the axis of the transverse bore 8 within a cylindrical brass sleeve 12. The sleeve 12 is in turn fixed within the bore 8 by a further metal locating and connector pin 13 which also extends through the head 4 into the interior of the casing 1. A helical spring 14 is located within the sleeve 12 and bears at one end on the slidable nipper element 10, urging the latter towards the fixed nipper element 9, and at its other end against an adjustable stop 15 which is movable along the axis of the sleeve 12 by means of a screw adjuster 16.

The fixed nipper element 9 has a flat contact surface 17, (FIG. 2) which is located in the central plane of the slot 7. The movable nipper element 10 has a similar flat contact surface 18 which, in the absence of any line between the nipper elements 9, 10 makes face-to-face contact with the surface 17 of the element 9, as shown in FIG. 4.

The movable nipper element 10 is urged into engagement with the fixed nipper element 9 by the spring 14, with a force which is adjustable by means of the adjusting screw 16. When, therefore, a portion of a fishing line 19 is located between the two contact surfaces 17, 18 as shown in FIG. 2, the line 19 is releasably clamped against removal from between the nipper elements 9, 10 with a force which is dependent upon the setting of the screw adjuster 16.

The casing 1 houses, at its end adjacent the head 4, an electrical buzzer unit 20 of a type known per se. The buzzer unit 20 includes a solenoid 21 which is mounted on the internal face of the head 4 and a soft iron armature 22 which is supported for movement towards and away from one end of the solenoid 21 on a spring strip 23. The circuit of the solenoid 21 includes make-and-break contacts 24, 25, one of which, 24, is carried by the armature 22 and the other of which, 25, is carried by a metal screw-threaded pin 26 which is adjustably located in an insulating support 27 mounted on the pin 13 and two support pins 28 (one only of which is shown in FIG. 1) attached to the head 4.

It will be seen that the buzzer unit 20 and the head 4 form a complete sub-assembly which can be assembled, set and adjusted before installation in the casing 1.

The spring strip 23 is attached to a metal support arm 29 attached to the head 4. An electrical connection is made from the arm 29 to one end of the solenoid 21. The other end of the solenoid 21 is electrically connected to the connector pin 11, which is insulated from the arm 29 by an insulating grommet 11a.

The connector pin 13 is connected within the housing 1 to the support 27 and has an insulating sleeve 13a over part of its length. A manually operable master switch 30, which operated by sliding movement longitudinally along the exterior or the casing 1 in the manner of a conventional flash-light switch, has a spring contact 30a connected to the metal casing 1. In the "on" or closed position of the switch 30 the spring contact 30a makes with the pin 13, as illustrated, while in the "off" or open position of the switch 30 the contact 30a rests on the insulating sleeve 13a.

A portable source of direct current for operating the buzzer 20 is afforded by a dry cell 31 housed within the casing 1 between the support 27 and the cap 2. In the manner of a conventional flash-light electrical contact is made between the casing 1 and the negative base electrode of the cell 31 through the cap 2, where the latter is of metal, as in this example, and a contact spring 32 attached to the internal surface of the cap 2. Contact is made with the positive terminal 33 of the cell 31 by means of a metal contact 34 which is carried by the insulating support 27 and is electrically connected, through a metal plate 35 secured to the support 27, to the pin 26 and, therefore, to the adjustable contact 25 of the make-and-break contacts. Pin 13 is insulated from plate 35 by an insulating grommet 13b, similar to grommet 11a.

It will be seen that the electrical buzzer unit 20 has a simple electrical energizing circuit including the cell 31 and two controlling switches in series: the manually operable master switch 30 and the switch constituted by the electrically conducting nipper elements 9, 10. Both these switches must be closed to complete the energizing circuit and render the buzzer unit 20 operative. In detail, the circuit comprises the cell 31, contact 34, plate 35, pin 26, make-and-break contacts 24, 25, spring strip 23, arm 29, solenoid 21, connector pin 11, nipper elements 8 and 9, connector pin 13, master switch 30, casing 1, cap 2 and contact spring 32.

The entire bite detector device is adapted to be mounted on a fishing rod 36 (FIGS. 4 and 5) at a position adjoining a fixed spool reel 37 of a known type (FIG. 5) also mounted on the rod 36. The device is positioned on the rod 36 so that the master switch 30 is easily accessible to an angler using the reel 37. For mounting the device on the rod 36 the casing 1 is provided with a pair of sheet metal clamp arms 38 which can be drawn together to clamp the casing 1 to the rod 36 by means of a thumbscrew 39. The device is clamped to the rod 36 so that the head 4 faces towards the free end of the rod, that is, away from the handle of the latter, with the slot 7 extending substantially horizontally (FIG. 5).

To use the bite detector device, the fishing line 19, usually of Nylon is paid off from the reel 37 and passes along the rod 36 into the water in the conventional manner. A part of the line 19 between the reel 37 and the water is located between the nipper elements 9, 10 so as to be releasably clamped between the contact surfaces 17, 18 thereof, as illustrated in FIGS. 2 and 3. To facilitate the introduction of the part of the line 19 between the nipper elements 9, 10 the edges of the nipper elements 9, 10 bounding the contact surfaces 17, 18 are bevelled as illustrated in FIG. 2.

Once the line 19 is clamped between the nipper elements 9, 10 in this way the master switch 30 is closed, and the bite detector device is then in a condition of readiness.

Should a fish take the end of the line 19 and exert a pull on the line sufficient to withdraw the clamped part of the line 19 from its position between the surfaces 17, 18 of the nipper elements 9, 10, the latter elements will immediately come into contact with each other by virtue of the spring 14 and the energizing circuit for the buzzer unit 20 will be completed. The buzzer unit 20 is therefore energized and gives the angler an immediate audible warning of the occurrence of a "bite", enabling the angler to judge correctly the timing of his "strike", that is, the locking of the line 19 to the reel 37 and raising of the rod 36.

In the case of the fixed spool type of reel 37 illustrated locking of the line 19 when "striking" is effected by moving the bail arm 40 of the reel mechanism from its inoperative position, shown in FIG. 5, in which the line 19 is free-running, into its operative position for winding-in of the line. The angler, having been given the audible warning by the buzzer unit 20, can then stop the operation of the latter by opening the master switch 30.

To improve the durability and weatherproofness of the device the contacting areas of the nipper elements 9, 10 are preferably formed in stainless steel and the make-and break contacts 24, 25 are preferably of solid silver.

If desired, the casing 1 and the cap 2 may be formed in plastics, with suitable conductive inserts for the electrical energizing circuits of the buzzer unit 20.

In addition to, or instead of, the audible warning means in the form of the buzzer 20, the device according to the invention may be provided with a warning lamp connected in the energizing circuit associated with the nipper elements.

It will be appreciated that the bite detector device according to the invention, while being particularly well-suited for use in conjunction with a fixed spool reel, is also readily adaptable to other types of reel, including rotary spool reels, and indeed can be used in conjunction with any type of fishing line.

I claim:

1. A bite detector device for use with a fishing rod, comprising:

a portable casing adapted to house a source of electrical energy;

a head made of electrically non-conductive material attached to one end of the casing and having an exposed face provided with a transverse slot adapted to receive part of a fishing line;

clamp means on said casing for releasably securing the device to a fishing rod;

a pair of relatively movable electrically conductive nipper elements supported within said head and insulated thereby, said nipper elements being abuttable within said slot;

resilient biasing means within said head urging said nipper elements towards each other to make electrical contact with each other in said slot, in the absence of a line between them and to clamp a part of the fishing line between said nipper elements when said part of the line is in said slot and positioned between them;

guide means associated with said nipper elements for guiding said part of the fishing line between said nipper elements to spread them against the bias of said resilient means when said part of the fishing line is received in the transverse slot;

electrical warning indicator means; and an electrical energizing circuit including said source of electrical energy, said warning indicator means and said nipper elements being completed to energize said warning indicator means upon relative movement of said nipper elements into contact with each other as a result of removal of said part of the fishing line from between said nipper elements.

2. Device as claimed in claim 1, in which the warning indicator means comprise an electrically operated audible warning device.

3. Device as claimed in claim 1, including means for adjusting the pressure with which the nipper elements are resiliently urged towards each other and, therefore, the force with which a part of a line located between the nipper elements is clamped.

4. In combination, a fishing rod having a fixed spool reel carrying line, and a bite detector device according to claim 1 mounted on the rod, the bite detector device being clamped to the fishing rod with the slotted face of the device directed towards the free end of said rod.

5. A bite detector device as claimed in claim 1, wherein said nipper elements have flat contact surfaces which, in the absence of a said part of a fishing line between said elements, meet in face-to-face contact, said flat contact surfaces being bounded by beveled edge surfaces forming said guide means to assist the insertion of a said part of a fishing line between the elements.

6. A bite detector device as claimed in claim 1, wherein said electrical energizing circuit includes a manually operable master switch mounted on the casing and connected in series in said circuit.

7. A bite detector device as claimed in claim 1, wherein one of said nipper elements is fixed in said head and the other is movable relative thereto in a direction transverse to said slot, said resilient biasing means acting on the movable nipper element, and an adjustable stop bearing against the end of said spring remote from the movable nipper element and effective to adjust the force with which the nipper elements are urged towards each other.

8. A bite detector device as claimed in claim 1, wherein one of said nipper elements if fixed in said head and the other nipper element comprises a plunger coaxial with the fixed nipper element and movable in the direction of its axis in a bore in said head perpendicular to said slot, said resilient biasing means comprising a biasing spring located in said bore and an adjustable stop located at the outer end of said bore, and bearing against the end of said spring remote from the movable nipper element, said adjustable stop being effective to adjust the force with which the movable nipper element is urged towards the fixed nipper element.

\* \* \* \* \*